United States Patent [19]
Hasebe et al.

[11] Patent Number: 5,761,651
[45] Date of Patent: Jun. 2, 1998

[54] SOFTWARE CHARGING SYSTEM AND SOFTWARE DATA UTILIZATION PERMITTING DEVICE

[75] Inventors: Takayuki Hasebe; Naoya Torii; Noboru Iwayama; Masahiko Takenaka; Masahiro Matsuda, all of Kawasaki, Japan

[73] Assignee: Fujitsu Limited, Kawasaki, Japan

[21] Appl. No.: 490,049

[22] Filed: Jun. 13, 1995

[30] Foreign Application Priority Data

Aug. 10, 1994 [JP] Japan .................. 6-188667

[51] Int. Cl.$^6$ .................................................. G06F 17/60
[52] U.S. Cl. ........................... 705/400; 705/30; 705/32
[58] Field of Search ............................. 194/215, 216, 194/217; 222/2; 364/400, 401, 406, 464.01, 464.1; 380/4; 395/230, 232

[56] References Cited

U.S. PATENT DOCUMENTS

| | | | |
|---|---|---|---|
| 4,247,106 | 1/1981 | Jeffers et al. | 273/856 |
| 4,439,670 | 3/1984 | Basset et al. | 235/382 |
| 4,446,519 | 5/1984 | Thomas | 395/491 |
| 4,484,217 | 11/1984 | Block et al. | 358/84 |
| 4,558,176 | 12/1985 | Arnold et al. | 178/22.08 |
| 4,590,557 | 5/1986 | Lillie | 395/700 |
| 4,593,376 | 6/1986 | Volk | 364/401 R |
| 4,646,234 | 2/1987 | Tolman et al. | 380/4 X |
| 4,649,510 | 3/1987 | Schmidt | 380/4 |
| 4,654,799 | 3/1987 | Ogaki et al. | 364/479 |
| 4,658,093 | 4/1987 | Hellman | 380/25 |
| 4,672,554 | 6/1987 | Ogaki | 364/479 |
| 4,674,055 | 6/1987 | Ogaki et al. | 364/479 |
| 4,740,890 | 4/1988 | William | 380/4 X |
| 4,780,905 | 10/1988 | Cruts et al. | 380/44 |
| 4,787,050 | 11/1988 | Suzuki | 364/479 |
| 4,796,181 | 1/1989 | Wiedemer | 364/406 |
| 4,816,653 | 3/1989 | Anderl et al. | 235/380 |
| 4,816,654 | 3/1989 | Anderl et al. | 235/380 |
| 4,817,140 | 3/1989 | Chandra et al. | 380/4 |
| 4,864,516 | 9/1989 | Gaither et al. | 395/153 |
| 4,879,645 | 11/1989 | Tamada et al. | 235/380 X |
| 4,937,863 | 6/1990 | Nashua et al. | 380/4 |
| 4,949,257 | 8/1990 | Orbach | 364/401 |
| 4,999,806 | 3/1991 | Chernow et al. | 380/4 X |
| 5,006,849 | 4/1991 | Baarman et al. | 341/95 |
| 5,008,814 | 4/1991 | Mathur | 371/19 X |
| 5,014,234 | 5/1991 | Edwards, Jr. | 395/186 |
| 5,016,009 | 5/1991 | Whiting et al. | 341/67 |
| 5,051,822 | 9/1991 | Rhoades | 358/86 |
| 5,056,009 | 10/1991 | Mizuta | 393/490 |
| 5,103,392 | 4/1992 | Mori | 380/4 |
| 5,103,476 | 4/1992 | Waite et al. | 380/4 |
| 5,166,886 | 11/1992 | Molnar et al. | 364/479 |
| 5,181,107 | 1/1993 | Rhoades | 358/86 |
| 5,199,066 | 3/1993 | Logan | 380/4 |
| 5,214,697 | 5/1993 | Saito | 380/4 |
| 5,222,134 | 6/1993 | Waite et al. | 380/4 |
| 5,245,330 | 9/1993 | Wassink | 340/825.34 |
| 5,267,171 | 11/1993 | Suzuki et al. | 364/479 |
| 5,367,704 | 11/1994 | Hasuo et al. | 395/800 |
| 5,386,369 | 1/1995 | Christiano | 364/464.01 |

FOREIGN PATENT DOCUMENTS

| | | |
|---|---|---|
| 57-127249 | 8/1982 | Japan . |
| 5-89363 | 4/1993 | Japan . |
| 5-266575 | 10/1993 | Japan . |
| 5-298058 | 11/1993 | Japan . |
| 6-95871 | 4/1994 | Japan . |

*Primary Examiner*—Edward R. Cosimano
*Attorney, Agent, or Firm*—Staas & Halsey

[57] ABSTRACT

A software charging system includes a utilization permitting device for giving permission to use a software storing medium storing ciphered programs or data (software); and an authorization center capable of communicating with the utilization permitting device for setting a utilizable amount, totalling utilization amounts and charging a user. The utilization permitting device includes: a utilization permission processing part having a clock for obtaining date and time data, and having a date and time data storing unit for storing obtained date and time data until obtaining next data and time data; and a utilization amount managing part for calculating a software utilization amount of an end user. A software utilization amount is managed based on the number of days at the utilization permission processing part.

24 Claims, 11 Drawing Sheets

SOFTWARE CHARGING SYSTEM AND SOFTWARE DATA UTILIZATION PERMITTING DEVICE

BACKGROUND OF THE INVENTION

The present invention relates to a technology effective for and applicable to a system for distributing software including computer programs, video works, etc., in particular such softwares as digitized data or the like.

With the advances in such large size storage media as CD-ROM or the like and in such high speed communication technologies as B-ISDN or the like, it can be expected that by using these devices that images, sounds and needless to say computer programs will be distributed as digital data.

That is, the situation has already emerged, wherein video works, which conventionally used to be sold in video tapes, are sold in CD-ROM or games using the interactive characteristic of CD-ROM(bi-directional characteristic) and are distributed to the market.

Further, the same is true for communication lines. Video works as mentioned above are now sent to users via communication lines.

As it is very easy to copy these kinds of digital data on the other media and there is no possibility of decline in quality due to copying which often occurs in the case of analog data. Therefore, duplication of the same data is allowed creating a very high possibility that the profits of the manufacturers will suffer. In other words, as long as large capacity optical magnetic disks and magnetic disk devices are provided, the content of CD-ROM can easily be copied with only minimum knowledge of DOS commands.

Under these circumstances, it is often the case that renting of such digital data media is prohibited by the manufacturers because sufficient security checking is impossible.

However, as this kind of software is still very expensive, more often than not the end users hesitate to buy such software until they can make sure that it really is what they want or that it can be used for the hardware they own. Against such a background, new software distributing systems have started to be provided, wherein a number of softwares with functional limits attached are sold inexpensively stored in CD-ROM. When the end users select the ones they want from such softwares and send fees, codes for releasing the functional limits will be reported to them.

However, none of these distributing systems have proven effective in terms of sufficient utilization of software characteristics.

More specifically, as for the system for releasing the functional limits mentioned above, as the end users are most often required to pay fees in a lump sum, the amount to pay is inevitably very high. For example when they want to see only one scene of a movie or when they want to use table calculation software only for a week, it is very difficult to manage fees in accordance with the amount to be used.

In order to deal with this problem, as disclosed in a patent No. 6-19707 in OFFICIAL GAZETTE, a system has been provided, wherein utilizable charges are registered in an IC card beforehand. The utilizable charges stored in the IC card are registered in a system when chargeable software is used and subtraction is made from a balance by the system whenever the software is used.

The present invention is designed, by moving a step further from the previous technologies, to provide a technology for realizing in a specific manner a software charging based on the amount to be used.

SUMMARY OF THE INVENTION

The present invention includes a utilization permitting device for permitting use of software (programs or data) protected so as to prevent illegal utilization and an authorization center for setting utilization balance of the utilization permitting device, wherein the utilization permitting device is provided with a clock for obtaining date and time data, a date and time data storing unit for storing the obtained date and time data until next date and time data is obtained, a utilization permission processing part for generating utilization permitting signals for utilization requests, a utilization amount managing part for calculating the amount of utilizing software by end users, and thereby the software utilization amount is managed by the utilization permitting device based on a number of days.

By provision of the date and time data storing unit, it will be possible to manage the amount-based software charging in accordance with the number of days and the end users will be allowed to reproduce software at home easily as in the case of rental videos, etc.

DESCRIPTION OF THE PREFERRED EMBODIMENTS

Prior to description of the specific preferred embodiments, the outline of a construction according to the present invention will be described with reference to the accompanying drawings.

Figure 1:
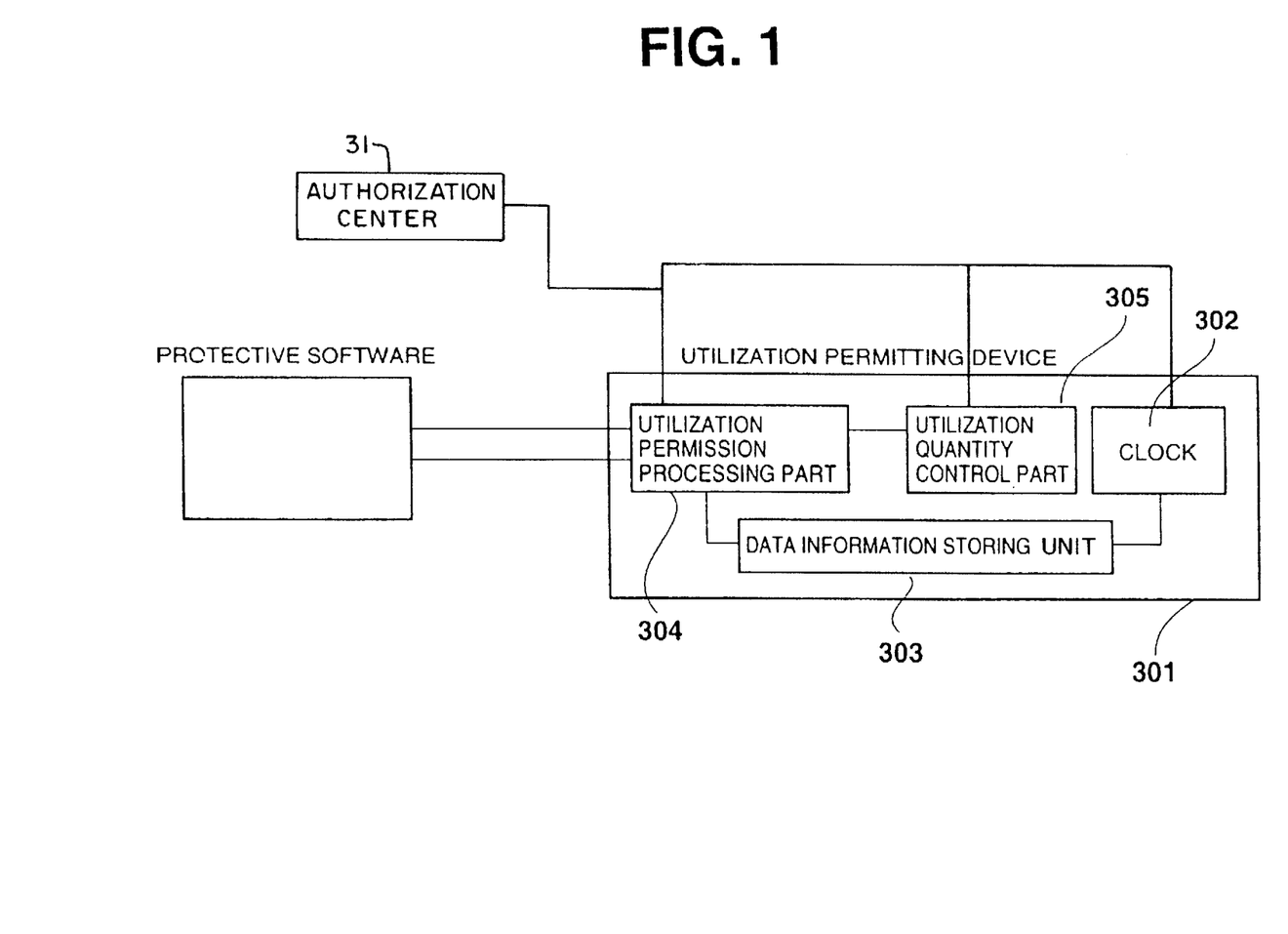
FIG. 1 is a block diagram showing the representative function as realized by the present invention.

As shown in FIG. 1, the present invention includes a utilization permitting device(301) for permitting use of software(programs or data) protected so as to prevent illegal utilization and an authorization center(31) for setting utilization balance of the utilization permitting device(301), wherein the utilization permitting device(301) is provided with a clock(302) for obtaining date and time data, a date and time data storing unit(303) for storing the obtained date and time data until obtaining next date and time data, a utilization permission processing part(304) for generating utilization permitting signals for utilization requests, a utilization amount managing part(305) for calculating the software utilization amount by end users, and thereby the software utilization amount is managed by the utilization permitting device based on the number of days.

According to the present invention, by provision of, for example, a date and time data storing unit, it will be made possible to manage amount-based software charging depending on the number of days and the end users will be allowed to reproduce software at home easily as in the case of rental videos.

The specific preferred embodiments will be described hereinbelow.

Figure 2:
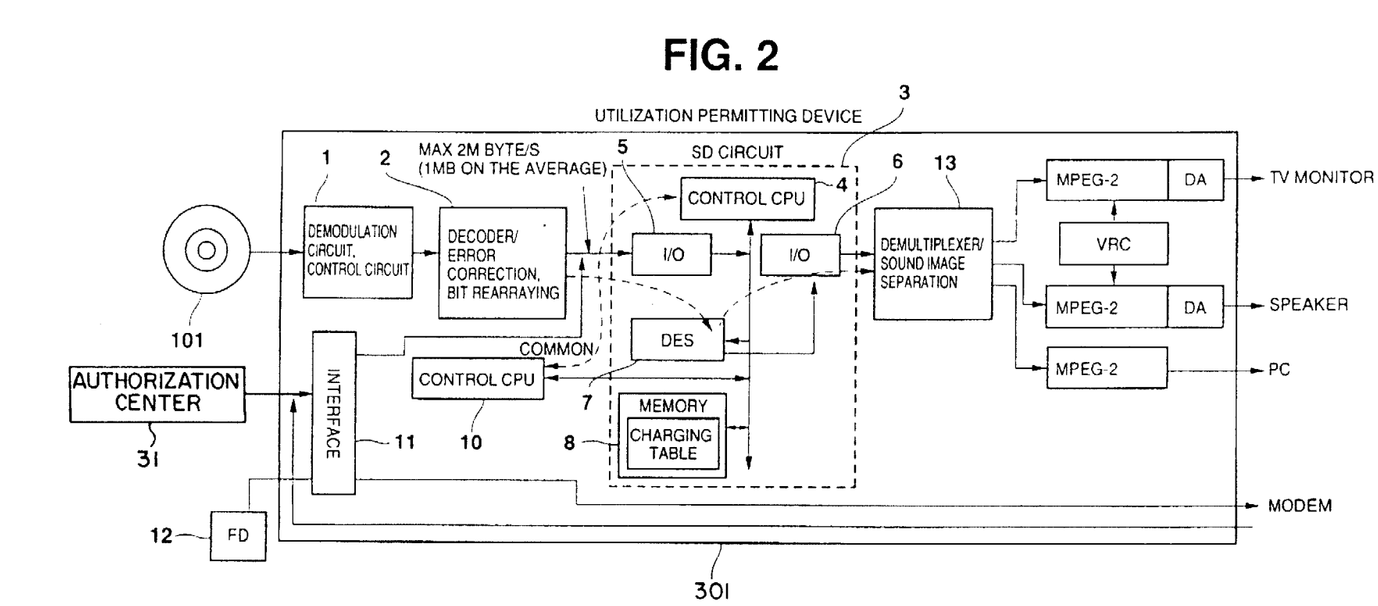
FIG. 2 is a block diagram showing the construction of a software reproducing device or a utilization permitting device according to the present invention.

FIG. 2 is a block diagram showing the construction of the utilization permitting device 301 according to the first embodiment of the present invention. The utilization permitting device 301 is connected to authorization center 31 and flexible disk 12 by way of interface 11.

A part(SD CIRCUIT 3) surrounded by broken lines in FIG. 2 indicates a software managing module or SD circuit 3 which substantially composes the utilization permitting device 301 according to the present invention. This software managing module or SD circuit 3 may be fixed in a board or a card form within the utilization permitting device or may be an IC card freely attachably/detachably inserted into the card slot(e.g., PCIA standard card slot) of the utilization permitting device.

In the same Figure, 1 indicates a demodulation circuit and a control circuit 1 having a function for demodulating MPEG standard image and sound data stored in CD-ROM 101 and sending them to a decoder 2.

The decoder 2 is for executing error correction and bit rearraying and transferring image and sound data of up to 2 MB/sec. (1 MB/sec. on the average) to the SD circuit 3.

At the software managing module or the SD circuit 3, image and sound data (ciphering data) received through an input part of I/O5 are deciphered by DES (Data Encryption Standard) 7 which is a deciphering part 103 and sent to a demultiplexer 13 outside the SD circuit 3 through an output part of I/O6. As for DES 7, a chip called "46 DATA ENCRYPTION STANDARD NIST" made by FIPS' PUB INC., can be used, for example.

At the demultiplexer 13, sound and image data are separated and output to MPEG processing part (MPEG-2). The MPEG processing part (MPEG-2) is provided with a function for expanding data compressed MPEG standard image and sound data, and for example, a "ISO/IEC CD 13818' 1 3" standard chip can be used.

When sounds and images are separated and output, synchronization between image data and sound data will be adjusted.

In the case where they are output to a computer(PC), MPEG data will be output as digital outputs while in the case where they are output to a TV monitor or a speaker, they will be output as analog data after D/A conversion.

Further, though transmitting and receiving of these data are shared by a control CPU 10 within the utilization permitting device 301 which functions as a permission control part and a control CPU within the SD circuit 3, the control CPU 10 may be used doubling as the CPU 4 within the SD circuit 3.

Furthermore, though reference was made to the case where software is ciphered, it may be possible to incorporate certified routine in software and to carry out certifying for utilization.

(FUNCTION WITHIN SD CIRCUIT)

At the SD circuit 3, the control CPU 4 functions with memory 9 and identifies whether or not to permit deciphering at DES 7 as to ciphered software data read from a CD-ROM 101.

When carrying out this identification, the control CPU 4 will consult a charging table set on a memory 8 (credit balance register) and allow deciphering at the DES 7 only if there is credit balance on the charging table.

That is, in the memory 8 specified balance values are registered and charging values are subtracted in accordance with the deciphering processing amount or processing period of time of ciphered software data. When a user wishes to renew these balance values, the user is permitted to do so by communicating with the authorization center the increase of the balance values of the charging table(credit balance register) in the memory 8.

In FIG. 2, the functions of the utilization permission processing part 304 and the utilization managing part 305 are realized by the control CPU 4 and the memory 8. Also, though the clock 302 is omitted in FIG. 2, it is realized by, for example, a real time clock LSI and a battery. In this embodiment, a date and time data storing register 303 (date and time data storing means) is set in the memory 8, as well.

Figure 5:
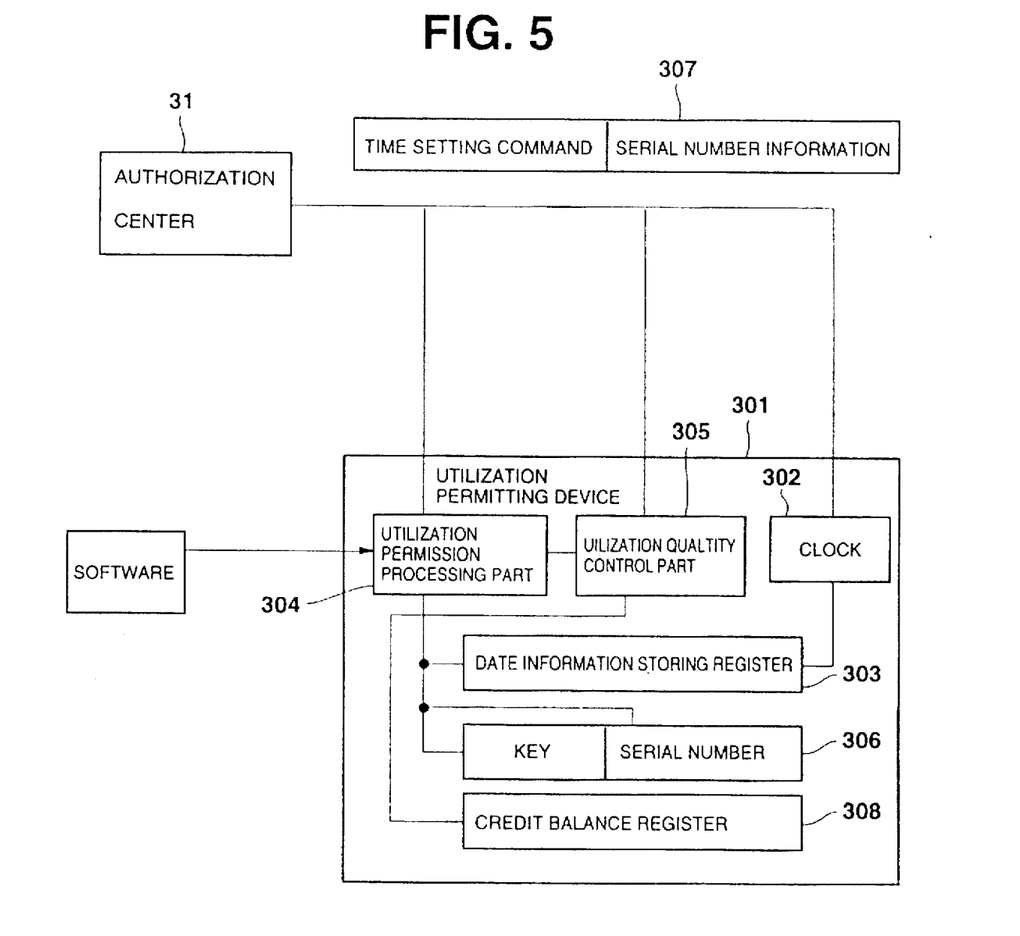
FIG. 5 is a block diagram showing a functional construction of the embodiment 1.

FIG. 5 is a block diagram showing a functional construction at the first embodiment.

A utilization permitting device 301 includes a clock 302, a date and time data storing register 303, a utilization permission processing part 304, a utilization amount managing part 305, a key/serial number storing register 306 (key/serial number storing means) and a credit balance register 308.

The date and time data storing register 303 is set in the memory 8 within the SD circuit 3 shown in FIG. 1 and dates when softwares are reproduced are recorded therein being controlled by the control CPU 4.

The utilization permission processing part 304 and the utilization amount managing part 305 are specifically realized by the control CPU 4.

In the key/serial number register 306 device, specific key data and serial data (values of these serial number data are incremented) are stored after ciphering.

The credit balance register 308 is set as a charging table in the memory 8 shown in FIG. 2 and substraction is made from the charging balance in accordance with utilization of software.

Figure 3:
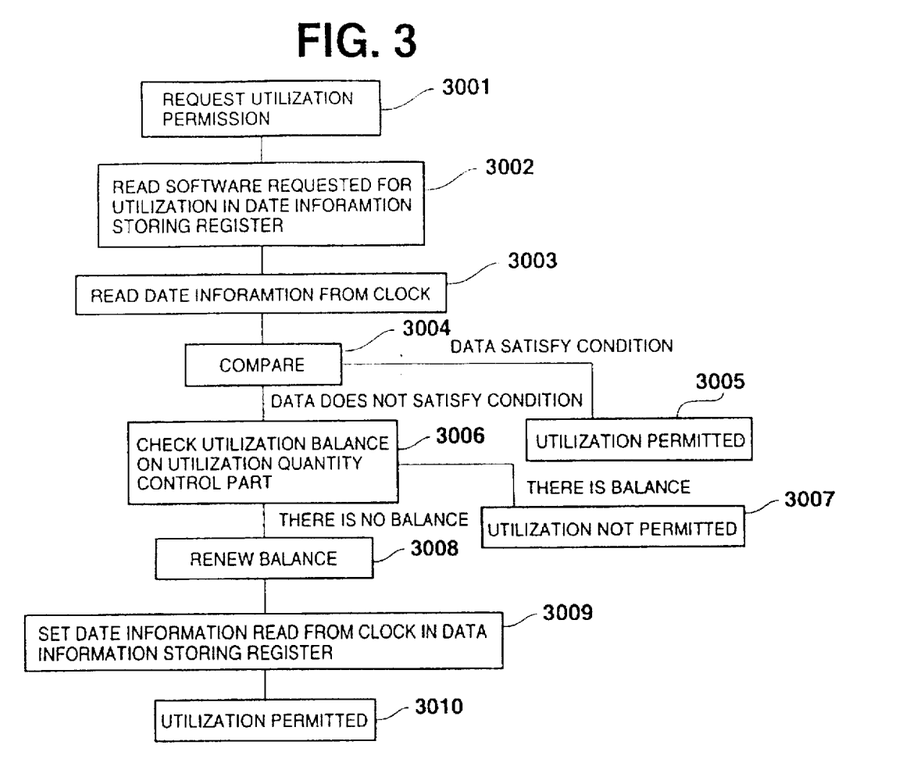
FIG. 3 is a flow chart showing a utilization permitting procedure of the embodiment 1.

Next, a utilization permitting flow in this embodiment will be described with reference to FIG. 3.

(DESCRIPTION OF UTILIZATION PERMITTING FLOW)

First, when receiving a utilization permission request from software (3001), the utilization permission processing part 304 will read the value stored in the date and time data storing register corresponding to utilization requested software (3002). Here, the date and time data storing register may be a single one or may be set for every softwares. Alternatively, it may be set for every specific software groups.

Next, current time is read by the clock 302 (3003).

Then, date and time data from the date and time data storing register and current time data obtained from the clock 302 are compared and identification will be made on whether the date satisfies the conditions (3004). Here, whether the date satisfies the conditions is determined by the following criteria. Selection of items in the criteria (they may be used in combination) described hereinbelow depends on software providers.

(1) ARE DATES THE SAME

According to this embodiment, amount-based charging of software reproduction is executed not by time units but by date units. More specifically, in the case where dates stored in the date and time data storing register 303 are earlier than those obtained by the clock 302, specified utilization fees will be subtracted from the credit balance register 308 considering that new software will be used (renew the balance 3008).

(2) IS THERE A TIME DIFFERENCE OVER THE SPECIFIED VALUE

In the case of charging by date units, charging equivalent to two days may be made if software is used repeatedly at the time interval of 20minutes as in the case where after software is used at 11:50 p.m. on the previous day the software is used again at 12:10 a.m on the next day.

Thus, even if data are used on different dates not as specified as in (1), utilization will be immediately permitted as a positive branch at the step 3004 if the data are reused over only a slight time difference (3005). For example, a time difference is set 12 hours or the like.

As shown above, when the conditions are satisfied at the step 3004, as a positive branch permission will be given to its utilization(3005). Based on this utilization permission, the DES7 within the SD circuit 3 will sequentially decipher the softwares and output them.

On the other hand, in the case where a movement is made to a negative branch at the step 3004, the utilization amount managing part 305 will access to the credit balance register 308 and check on the utilization balance (3006). Here, if the balance is over the specified value, that is, there is still room even if current utilization fees are subtracted, the balance will be renewed (3008). More specifically, renewing of the balance means that the balance value stored in the credit balance register 308 will be subtracted.

In the case where there is a shortage of the balance at the step 3006, deciphering of software will be rejected giving no utilization permission (3007).

Then, the utilization permission processing part 304 sets date and time data read from the clock 302 on the date and time data storing register 303 (3009). By this processing, the current utilization time (utilization starting time) of the software will be stored. Utilization is then permitted (3010).

(METHOD OF TIME COMPARING AND ADJUSTING FROM AUTHORIZATION CENTER)

A procedure for time comparing and adjusting from the authorization center 31 to the software reproducing device (utilization permitting device 301) will be described with reference to FIG. 4.

Figure 4:
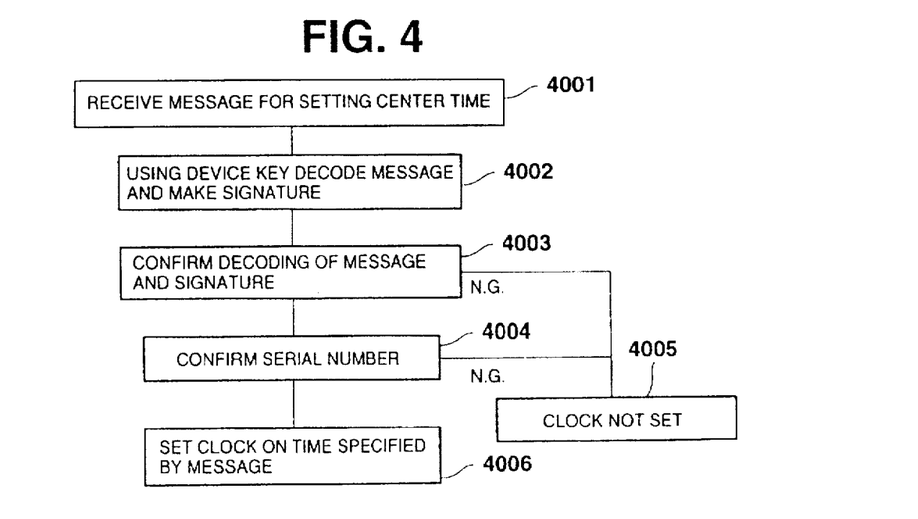
FIG. 4 is a flow chart showing a time comparing and adjusting procedure at the embodiment 1.

As shown in FIG. 4, a time adjusting message 307 (storing time data and serial number data and ciphered) are received by the utilization permitting device 301 from the authorization center 31(4001), the utilization permission processing part 304 will take out key data from the key/serial number storing register 306 and carry out deciphering of the message 307 at the DES 7 (4002). If a method by electronic signatures is used, electronic signatures will be made from the message.

When the deciphered message(time comparing and adjusting command) is confirmed (4003), serial number data in the message 307 will be compared with serial number data read from the key/serial number storing register 306. Then, only if the serial number data in the message coincide with those read from the key/serial number storing register 306, the propriety of the message 307 will be confirmed (4004). Though omitted in FIG. 4, the serial number data of the key/serial number storing register 306 will be incremented only by "+1" at this time. If the deciphered message is not confirmed in step 4003, the clock is not set (4005).

When the serial number is confirmed at the step 4004, the time of the clock 302 will be adjusted based on the time stored in the message(4006). If the serial number is not confirmed in step 4004, the clock will not be set (4005).

As for the time adjusting message 307, ciphering electronic signatures may be used. In such a case, the utilization permission processing part 304 will make signatures based on the time adjusting message 307 at the step 4002 and a confirming operation for them will be carried out at the step 4003.

Further, when utilizing the date and time data storing register 303 the period of time for using software is registered and utilization requests are made from the protected software, the utilization permission processing part 304 will read date and time data from the clock. When the value of the read date from the clock is smaller than that in the date and time data storing register 303, the utilization of the software may be permitted considering that there is still time until the expiration.

Figure 13:
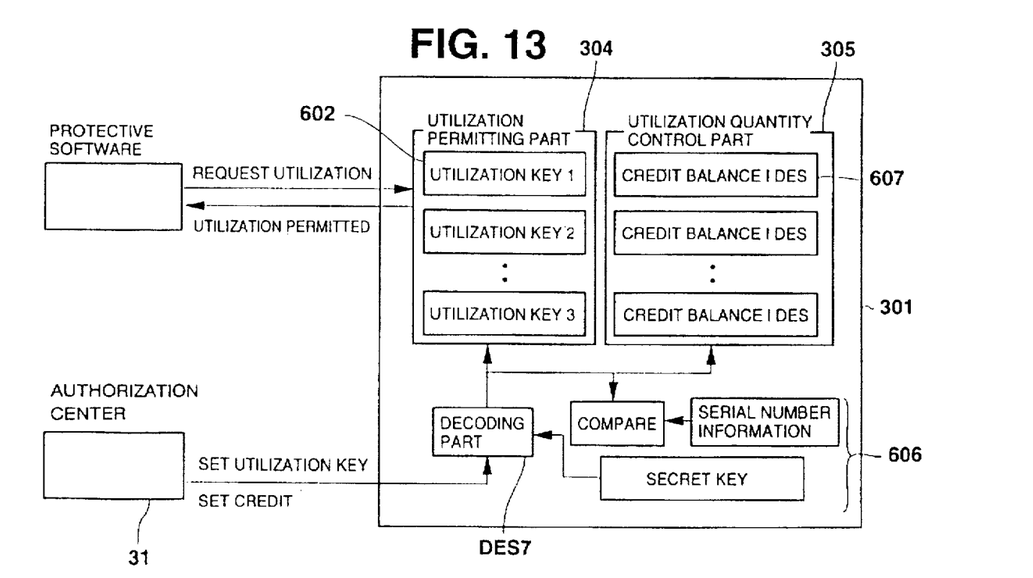
FIG. 13 is a block diagram showing a functional construction of the embodiment 2.

FIG. 13 is a block diagram showing a functional construction of the second embodiment.

The utilization permitting part 304 is provided with utilization keys 602 (1 to N) for every softwares while the utilization amount managing part 305 is provided with credit balance registers(1 to N).

The utilization permitting device 301 includes a key/serial number storing register 606 for storing key data and serial number data. This key/serial number storing register 606 is constructed by a secret key and serial number data.

Figure 14:
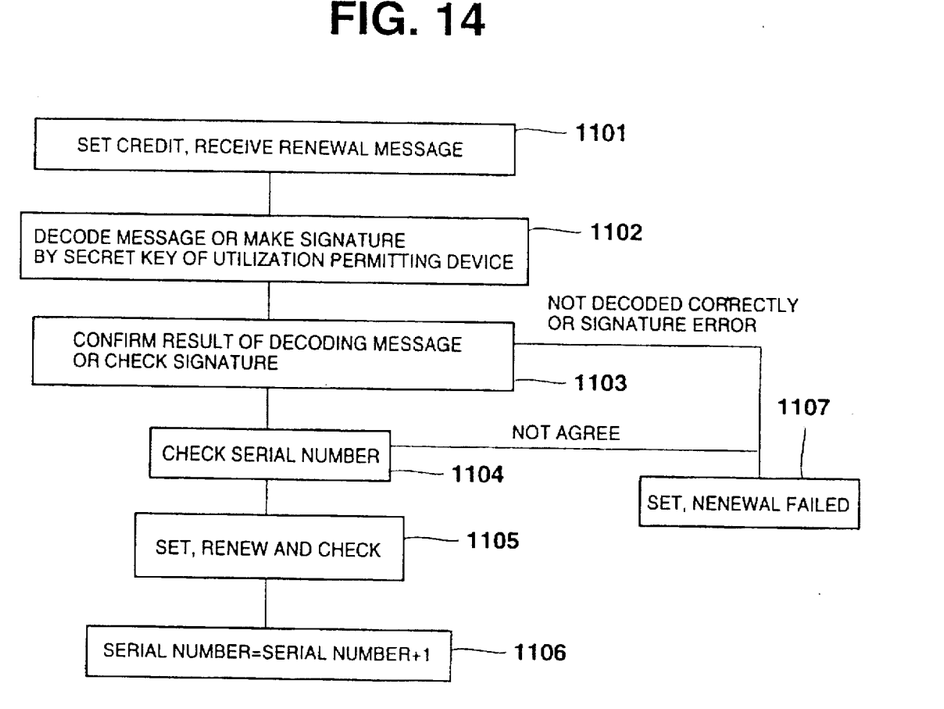
FIG. 14 is a flow chart showing a credit setting procedure of the embodiment 2.

Next, a procedure for setting credits at this embodiment will be described with reference to FIG. 14.

First, a secret key and a serial number are set within the utilization permitting device beforehand. Then, based on requests by the end users the authorization center 31 ciphers the credit values of respective software programs, utilization keys and serial data as a credit setting message the secret key and sends them to the utilization permitting device 301 (1101). Here, the utilization permission processing part 304 checks the deciphering state (1103). If deciphering has been carried out correctly it will compare the serial number data taken out of the message with that stored in the key/serial number storing register 606. If they coincide, the credit value take out of the message will be set in the credit balance register 607 of the utilization amount managing part 305, considering that propriety of the message has been proven (1105). Then, the value of the key/serial number storing register 606 will be incremented only by "+1"(1106).

On the other hand, in the case where there are deciphering errors or in coincidence generated at the step 1103 or 1104, the processing will be terminated considering that setting has failed(1107).

Further, instead of ciphering the credit setting message electronic signatures may be used. As for setting the utilization key and the credit, a different message may be used. In the case of using the signatures, however, ciphering will be necessary in order to further secure secrecy of the utilization key.

On the other hand, though reference was made to setting of the credit balance register, when the balance value declines and thus renewed to a new value, the operations similar to those at the steps 1101 to 1106 will be carried out.

Then, after the existence of the utilization key is made certain for the utilization requests from the protective software at the time of use, the credit balance will be confirmed and if there is still room in the balance, the utilization permit will be sent.

Figure 15:
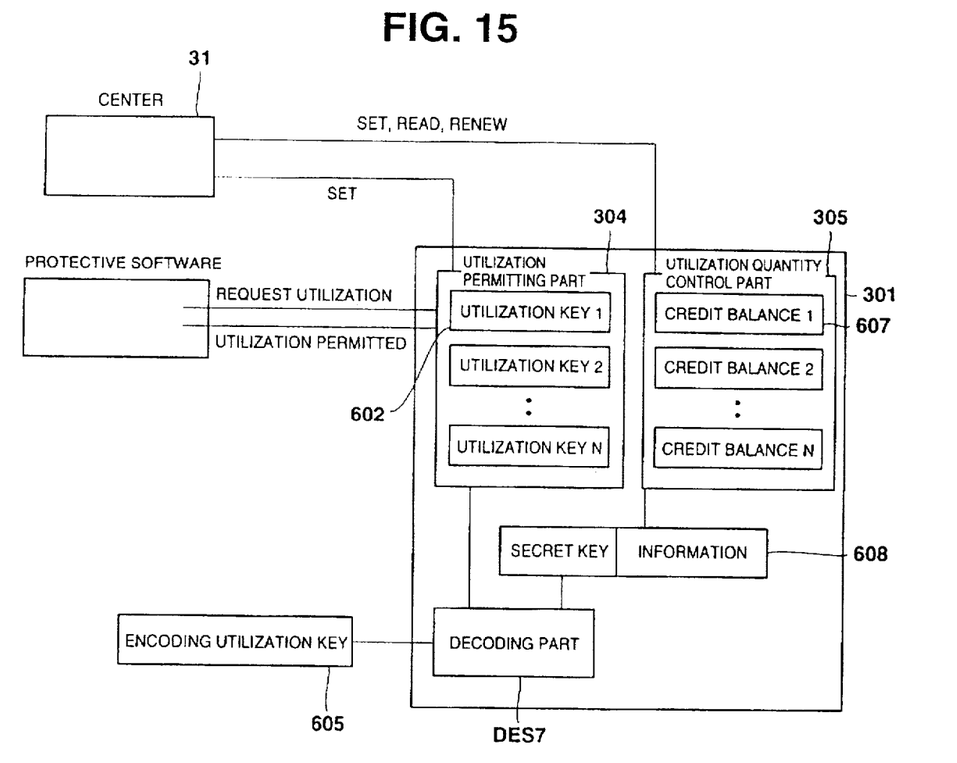
FIG. 15 is a block diagram showing the example of a changed construction of the embodiment 2.

FIG. 15 shows the construction in the case where instead of the key/serial number data storing register 606 a key clock data storing register 608 is provided.

At this construction, when wishing to renew the content of the credit balance register 607 from the authorization center 31, a credit balance renewal value and clock data will be linked, ciphered as a credit renewal message and sent to the utilization permitting device 301.

At the utilization permitting device 301, the received credit renewal message is deciphered at the deciphering part DES 7 and first the clock data is read from this renewal message. If at this time the value of the data is larger than that of the clock data stored in the key clock data storing register 608, the propriety of this renewal message will be guaranteed and the content of the credit balance register 607 will be renewed by the value read from the message.

Figure 6:
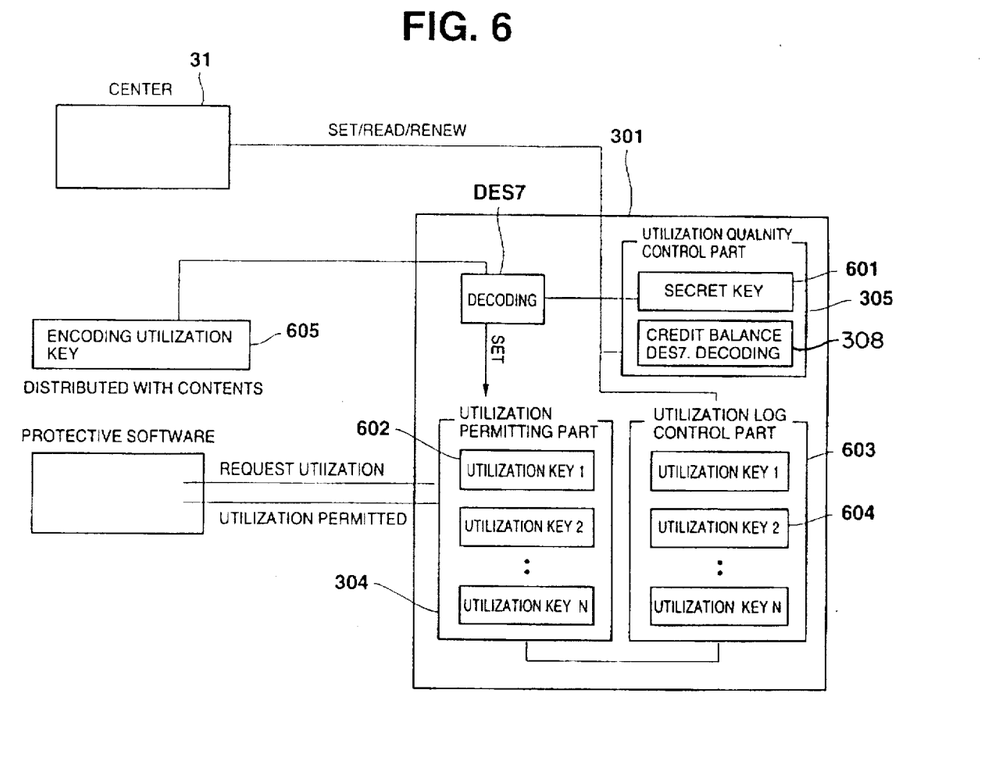
FIG. 6 is a block diagram showing a functional construction of the embodiment 3.

FIG. 6 is a block diagram showing a functional construction of the third embodiment.

The construction of the third embodiment is basically similar to that of the second embodiment. More specifically, in the third embodiment, a utilization amount managing part 305 is constructed by a control CPU 4 and a memory 8 while a secret key 601 and a credit balance register 308 are stored in this utilization amount managing part 305.

In a utilization permission processing part 304, for example, utilization keys 602 (1 to N) are stored for each software program. A utilization log managing part 603 is also provided, wherein utilization records 604 (1 to N) corresponding to the utilization keys 602 (1 to N) are stored.

By providing a plurality of such constructions, it will be made possible to dealt with a plurality of centers.

(SETTING OF CREDIT AND SECRET KEY)

In the case where a batch totalizing system is adopted relating to amount-based software charging as at this embodiment, the balance value of the credit balance register 308 will be shared by a plurality of software programs. For credit setting in such a case, first the authorization center 31 sends the credit value and the secret key to the utilization permitting device 301 based on requests by end users. At the utilization permitting device 301, the secret key and the credit balance value are stored in the utilization amount managing part 305.

Then, in the case where the end users utilize software, it will be necessary to set licenses (utilization rights). However, for this batch totalizing system communications with the authorization center 31 are preferred to be limited at every utilization of software. Thus, the licenses (utilization rights) must be ciphered by the secret key as a utilization key and distributed with the software beforehand. This ciphering utilization key 605 may be distributed with the protective software or may be distributed later in the form of an IC card or a prepaid card.

The ciphering utilization key 605 is deciphered by the secret key at the deciphering part (DES 7) of the utilization permitting device 301 and set in each area of the utilization permitting part 304 as a utilization key.

By utilizing the software, the balance value of the credit balance register 308 will be gradually reduced. However, if resetting of this credit is carried out, by receiving a credit value from the authorization center 31 the content of the credit balance register 308 will be renewed.

Figure 7:
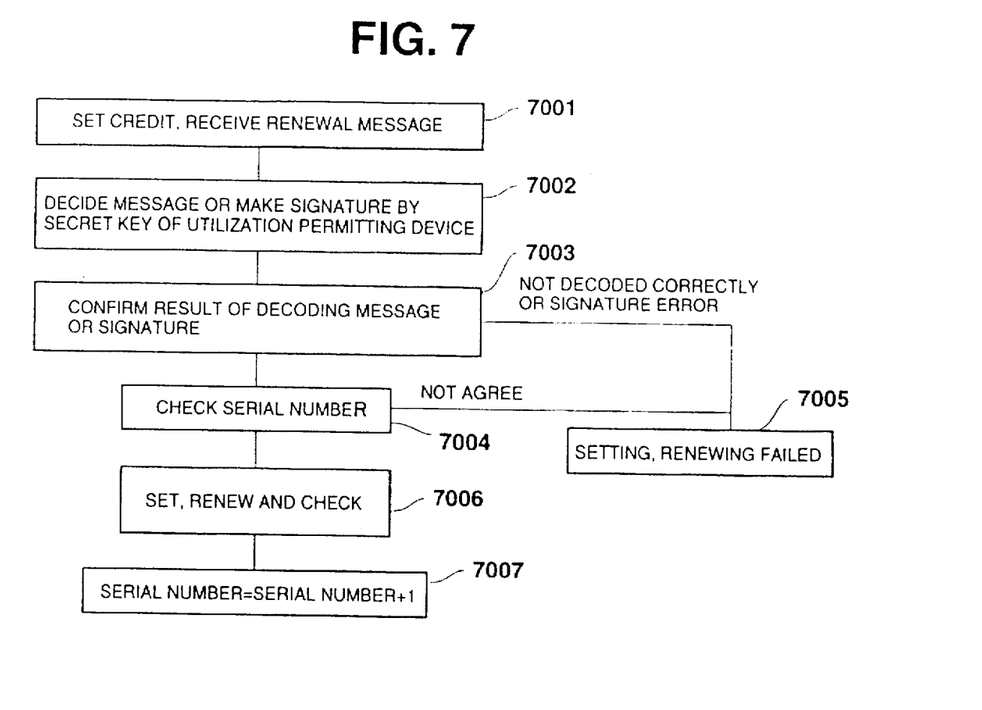
FIG. 7 is a flow chart showing a credit setting procedure of the embodiment 3.

This processing flow is shown in FIG. 7.

In FIG. 7, it is assumed that the utilization amount managing part 305 described with reference to FIG. 6 is provided with a key/serial number storing register 306 (see FIG. 5) for storing the secret key 601 and the serial number data.

When a credit setting and renewing message is received by the utilization permitting device 301 from the authorization center 31 (7001), the utilization permission processing part 304 will read the secret key 601 stored in the utilization amount managing part 305 and decipher the credit setting and renewing message at the deciphering part (DES 7) (7002 to 7003). In the credit setting and renewing message a credit value and a serial number are included and a comparison is made to see whether the deciphered serial number coincides with that of the serial number data stored in the key/serial number storing register 306 or not(7004). Here, if they coincide, the content of the credit balance register 308 will be renewed by the credit value. Lastly, the content of the key/serial number storing register 306 will be incremented only by "+1".

On the other hand, if there are deciphering errors or serial number disagreement generated at the step 7003 or 7004, the processing will be terminated considering that setting and renewing have failed(7005). In step 7006, a set, renew and check is performed. Then, in step 7007, the serial number is increased on one.

Figure 8:
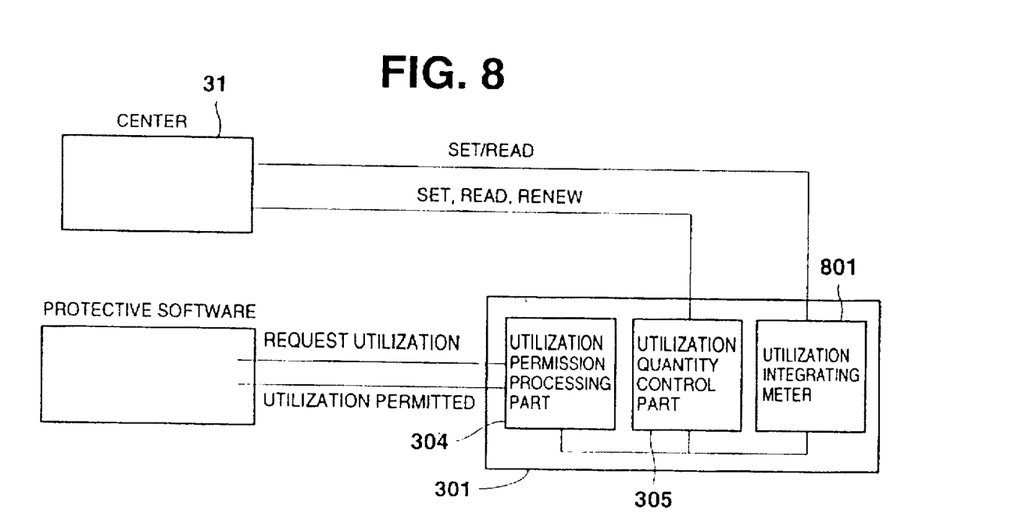
FIG. 8 is a block diagram showing a functional construction of the embodiment 4.

FIG. 8 is a block diagram showing a function of the fourth embodiment.

In the fourth embodiment, the utilization permitting device 301 is provided, in addition to the utilization permission processing part 304 and the utilization amount managing part 305, with a utilization amount integrating meter 801.

This utilization amount integrating meter 801 is set on the memory 8.

This utilization amount integrating meter 801 allows clearing of an integrated value by an instruction from the authorization center 31.

Next, referring to FIGS. 10 to 12, a method of buying software using the utilization amount integrating meter 801 will be described.

Figure 10:
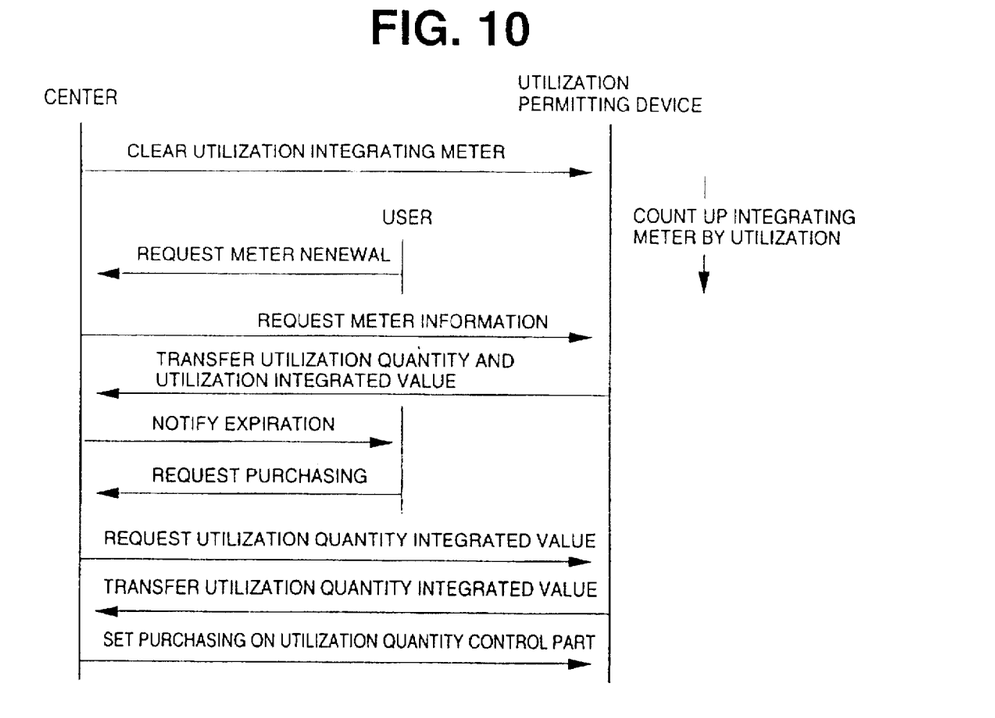
FIG. 10 is a sequential diagram showing a software buying procedure when utilization amount expires of the embodiment 4.

FIG. 10 shows a procedure for buying software when utilization amount expires.

More specifically, when a utilization amount integrating meter clearing command is received from the authorization center 31, the utilization permitting device 301 will return the utilization amount integrating meter 801 to an initial value. When software is started to be used in this state, depending on the utilization amount the utilization amount integrating meter 801 will be counted up.

Then, when there are meter renewing requests from the end users to the authorization center 31 as the software utilization amount has reached its limit, from the authorization center 31 a meter data requesting command will be sent to the utilization permitting device 301.

When receiving this meter data requesting command, the utilization permitting device 301 will transfer the data of the utilization amount managing part 305 and the integrated value of the utilization amount integrating meter 801 to the authorization center 31. At this time, in order to maintain security of the data to be sent, it is preferable to cipher the data.

At the authorization center 31 having received such data, if it is recognized that the utilization amount has already reached its limit for the software in these data, the authorization center 31 will make an expiration report to the end users. Such a method of reporting expiration may be the one wherein the operator reports it to the end uses orally through electric lines, the one wherein a reporting is made by register using mails, etc., or the one wherein using communication lines it is reported to the terminal devices (such as software reproducing devices or the like).

In this way, when buying requests are reported to the authorization center 31 by the end users, the authorization center 31 will issue utilization amount integrated value requesting commands to the utilization permitting device 301. Upon receiving these commands, the utilization permitting device 301 will read the utilization amount integrated values from the utilization amount integrating meter 801 and send them back to the authorization center 31.

After the authorization center 31 confirms expirations again based on the received utilization amount integrated values, the authorization center 31 will issue noncharging commands (commands indicating purchases) to the utilization amount managing part 305.

Figure 11:
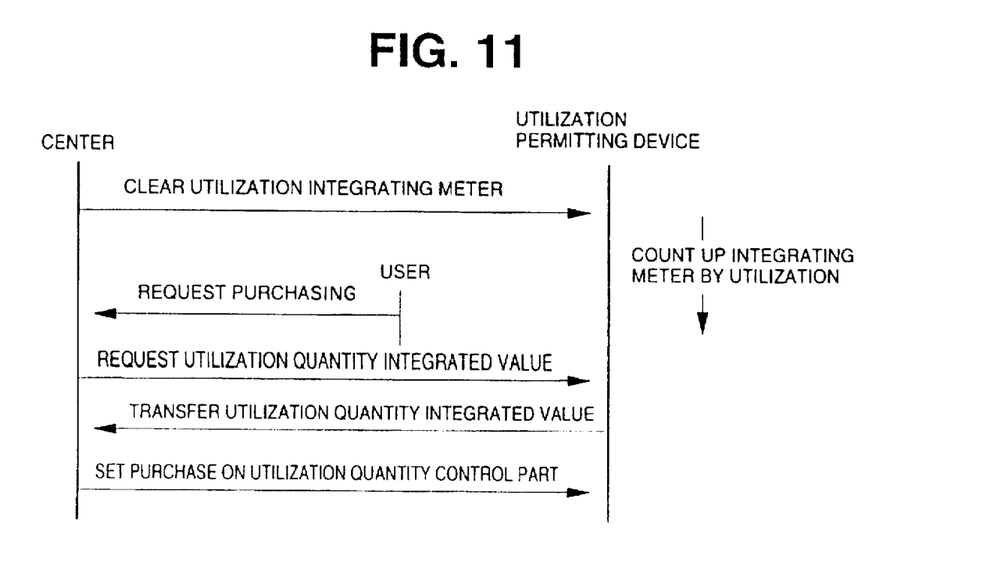
FIG. 11 is a sequential diagram showing a processing carried out when end users request to buy software in the middle of using it of the embodiment 4.

FIG. 11 shows a processing sequence of buying the software by the end user before expiration.

As similar to the case shown in FIG. 10, when receiving a utilization amount integrating meter clearing command from the authorization center 31, the utilization permitting device 301 will return the utilization integrating meter 801 to an initial value.

When utilization of the software is started in this state, depending on the utilization amount the utilization amount integrating meter 801 will be counted up.

In the case where the end user wishes to buy the software before this utilization amount integrating meter 801 indicates the limit of the integrated amount, based on the purchasing request from the end user the authorization center 31 will issue a utilization amount integrated value requesting command to the utilization permitting device 301.

Based on the utilization amount integrated value requesting command the utilization permitting command 301 will transfer the utilization amount integrated value read from the utilization amount integrating meter 801 to the authorization center 31.

Based on the received utilization amount integrated value the authorization center 31 will charge the amount gained by subtracting the fees which the user has already paid for the utilization amount from the selling price of the software to the end user. When charging this, the authorization center 31 will issue a noncharging command (a command indicating that it is purchasing) to the utilization amount managing part 305.

At the utilization permitting device 301 which has received the noncharging command, as long as it relates to this software, any subtractions will not be made from the credit balance register 308 of the utilization amount managing part 305 thereafter.

Figure 9:
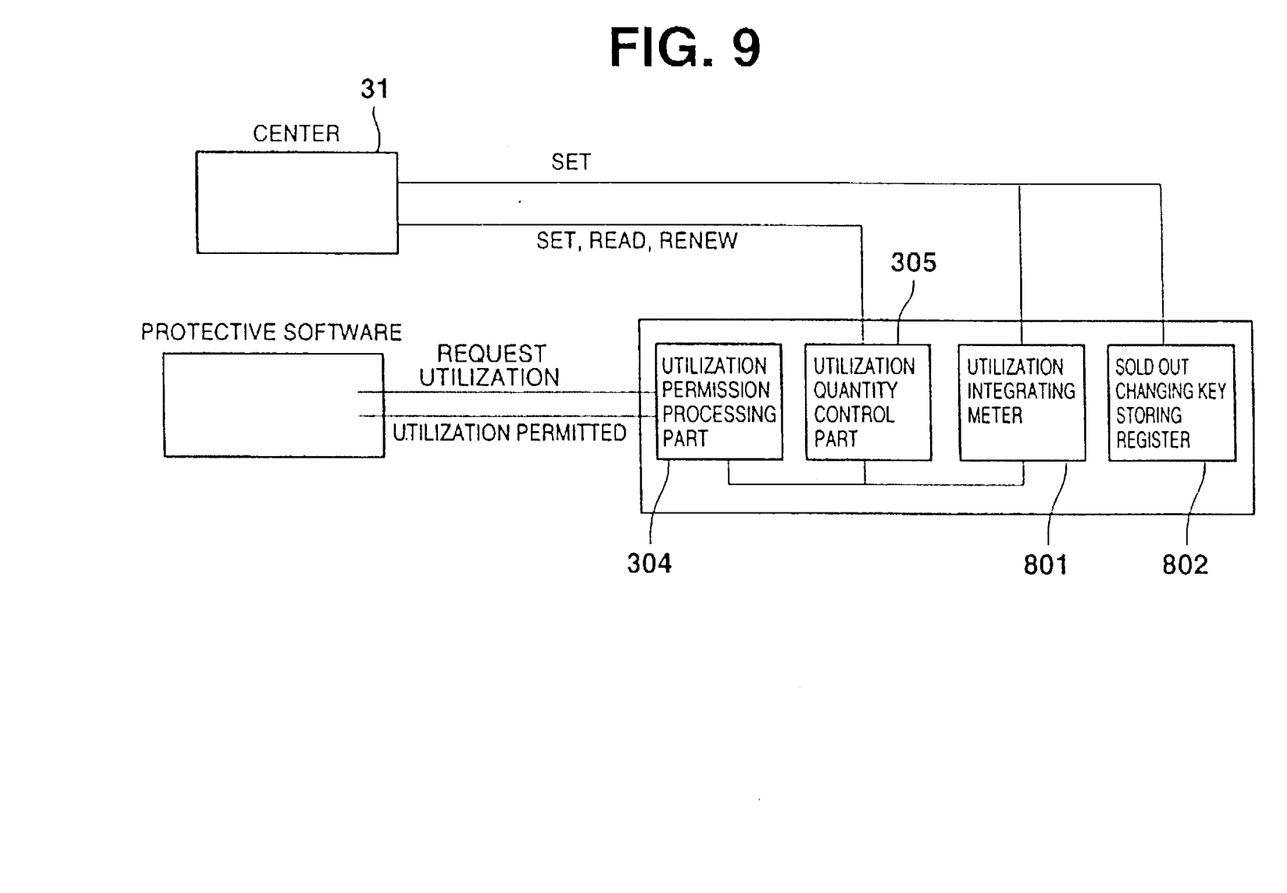
FIG. 9 is a block diagram showing the example of a changed construction of the embodiment 4.

FIG. 9 is a block diagram showing a function for preventing charging for the case where utilization exceeds the threshold value set by the utilization permitting device 301 itself. That is, a changed selling value storing register 802 is prepared in FIG. 9 and the values to be stored in this register will be changed from the commands from the authorization center 31.

Figure 12:
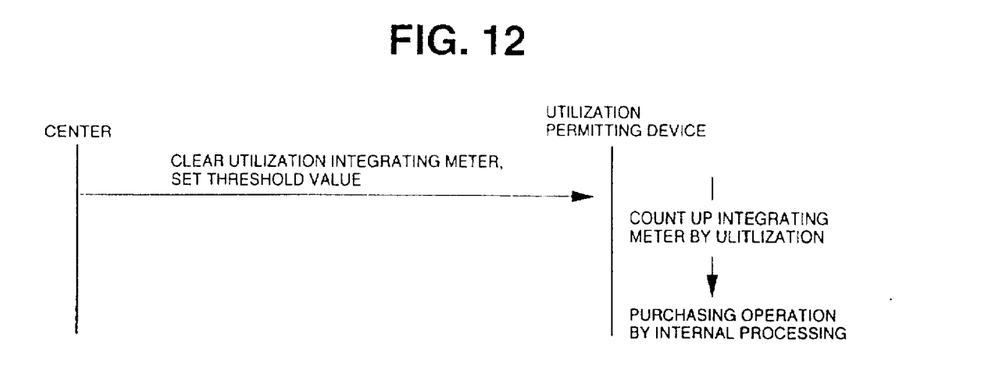
FIG. 12 is a sequential diagram showing a processing carried out when a buying processing is carried out within a utilization permitting device at the embodiment 4.

FIG. 12 shows its processing sequence.

First, a utilization amount integrated value clearing command and a threshold value setting command are sent from the authorization center 31 to the utilization permitting device 301. At the utilization permitting device 301 which has received these commands, the utilization amount integrating meter 801 will be cleared and a new threshold value, that is, a changed value, will be set in the changed selling value storing register 802.

In this state, the utilization amount integrating meter 801 will count up its stored value depending on the software utilization amount. Here, the stored value of the utilization amount integrating meter 801 is always compared with the value set in the changed selling value storing register 802.

Here, in the case where the value counted by the utilization amount integrating meter 801 is equal to or exceeds the one stored in the changed selling value storing register 802, the utilization permission processing part 304 will instruct the utilization amount managing part 305 not to do any subtracting from the credit balance register 308 thereafter.

What is claimed is:

1. A software charging system comprising a utilization permitting device permitting utilization of a software program, and an authorization center for setting a utilization amount on said utilization permitting device, wherein the utilization amount is a number of days of allowed use of the software program and said utilization permitting device includes:

a clock obtaining a date and a time;

date and time storing means for storing the obtained date and time until obtaining a next date and next time;

a utilization permission processing part generating utilization permitting signals for utilization requests in accordance with a balance of the utilization amount set by the authorization center; and a utilization amount managing part calculating the balance of the utilization amount based on the date and time obtained by said clock.

2. The software charging system according to claim 1, wherein said date and time storing means is set for each software program whose utilization is permitted by said authorization center.

3. The software charging system according to claim 1, wherein said utilization permitting device monitors software program utilization, renews the date and time stored in said date and time storing means and renews the utilization amount in the case where the date on which the software program is utilized is different from the date stored in said date and time storing means.

4. The software charging system according to claim 1, wherein said utilization permitting device monitors software program utilization, renews the date and time stored in said date and time storing means and renews the utilization amount in the case where there is a time difference over a specified value between the date and time on which the software program is utilized and the date and time stored in said date and time storing means.

5. The software charging system according to claim 1, wherein said date and time storing means allows setting of optional dates by a date and time setting command from the authorization center and said utilization permission processing part allows limiting a period of utilizing the software program by comparing date and time read from said clock at the time of utilizing the software program with a value stored in said date and time storing means and permitting utilization of the software program when the value of said date and time read from said clock is smaller than said value.

6. The software charging system according to claim 5, wherein said utilization permitting device further comprises key storing means for storing device-specific key data and a nonrepeating count storing means for storing nonrepeating counts for preventing command reutilization, said authorization center ciphers said nonrepeating counts and said date and time setting command and sends said ciphered nonrepeating counts and time comparing and adjusting command to said utilization permitting device, said utilization permitting device receives said ciphered date and time setting command and said nonrepeating counts and deciphers said ciphered nonrepeating counts and time comparing and adjusting command using key data read from said key storing means, said received and deciphered nonrepeating counts are compared with a value stored in the nonrepeating count storing means, and when its comparing result is correct, based on the received date and time setting command the date and time is set in the date and time storing means.

7. The software charging system according to claim 1, wherein said date and time obtained by the clock is compared and adjusted by a time comparing and adjusting command from said authorization center.

8. The software charging system according to claim 7, wherein said utilization permitting device includes key storing means for storing device-specific key data and nonrepeating count storing means for storing nonrepeating counts for preventing reutilization of a command, said authorization center ciphers said nonrepeating counts and said time comparing and adjusting command by said key data and sends said ciphered nonrepeating counts and time comparing and adjusting command to said utilization permitting device, said utilization permitting device receives said ciphered time comparing and adjusting command and said nonrepeating counts and deciphers said ciphered nonrepeating counts and time comparing and adjusting command using key data read from said key storing means, said received and deciphered non repeating counts are compared with a value stored in the nonrepeating count storing means, and in the case where a comparing result is right, the clock is compared and adjusted based on the received time comparing and adjusting command.

9. The software charging system according to claim 8, wherein, as said nonrepeating counts serial numbers are used, a command using said nonrepeating counts is received, and when comparing result is correct, the serial numbers are renewed.

10. The software charging system according to claim 9, wherein said serial numbers are managed by the authorization center.

11. A software charging system comprising:

an authorization center setting a utilization amount; and a utilization permitting device including a utilization amount managing part calculating a balance of the utilization amount set by the authorization center, and a utilization permission processing part allowing access to protected software in accordance with the balance of the utilization amount calculated by the utilization amount managing part, wherein, said utilization permitting device includes utilization key data storing means for storing utilization key data necessary for permitting software utilization, said utilization amount managing part includes credit balance storing means for each software program whose stored values are set and renewed by a credit balance setting command from the authorization center, said authorization center totals software programs provided when the utilization amount is set, said setting of said secret key is operated at the same time as setting of said credit balance, said utilization permitting device further comprises key storing means for storing device-specific key data and a nonrepeating count storing means for storing nonrepeating counts for preventing command reutilization, and said authorization center ciphers said nonrepeating counts and said credit setting command by said key data and sends said ciphered nonrepeating counts and credit setting command to said utilization permitting device, said utilization permitting device receives said ciphered credit setting command and the nonrepeating counts and deciphers said nonrepeating counts and credit setting command using key data read from said key storing means, said received deciphered nonrepeating counts are compared with a value stored in the nonrepeating count storing means, and only when its comparing result is correct, based on the received credit setting command, a credit balance is set in the credit balance storing means.

12. A software charging system comprising:

an authorization center setting a utilization amount;

a utilization permitting device including a utilization amount managing part calculating a balance of the utilization amount set by the authorization center, and a utilization permission processing part permitting utilization of protected software in accordance with the balance calculated by the utilization amount managing part, wherein, said utilization permitting device includes utilization key data storing means for storing utilization key data necessary to permit software program utilization, said utilization amount managing part includes credit balance storing means shared by a plurality of software programs, and a plurality of groups of secret key storing means for storing secret keys, and said utilization key is ciphered by said secret keys and added to said software program.

13. The software charging system according to claim 12, wherein setting of said secret keys is operated at the same time as setting of said credit balance.

14. The software charging system according to claim 12, wherein utilization prices subtracted from the credit at each utilization are ciphered together with said utilization key by said secret keys and added to the software program.

15. The software charging system according to claim 12, further comprising a utilization amount recording part for registering a utilization record for each software program.

16. The software charging system according to claim 12, wherein said authorization center ciphers a key corresponding to said authorization center by a device-specific key and sends the ciphered key to said utilization permitting device, and said utilization permitting device receives the ciphered key and deciphers the ciphered key by using key data read from said key storing means and set in the secret key storing means of the corresponding authorization center.

17. The software charging system according to claim 12, wherein said utilization permitting device includes key storing means for storing device-specific key data and a nonrepeating count storing means for storing nonrepeating counts for preventing command reutilization, said authorization center ciphers said nonrepeating counts and said credit setting command and sends the ciphered nonrepeating counts and said credit setting command to said utilization permitting device, said utilization permitting device receives the ciphered nonrepeating counts and said credit setting command and using key data read from said key storing means said credit setting command and said nonrepeating counts are deciphered, said received nonrepeating counts are compared with a value stored in the nonrepeating count storing means, and when its comparing result is correct, based on the received credit setting command, a credit balance is set in the credit balance storing means.

18. A software charging system comprising:

an authorization center setting a utilization amount;

a utilization permitting device having a utilization permission processing part for permitting use of at least one of software programs and data protected so as to prevent illegal utilization and a utilization amount managing part for calculating a balance of the utilization amount set by the authorization center, wherein said utilization amount managing part includes a utilization amount integrating meter set for each software for calculating an integrated amount of the software utilization, and said utilization permission processing part monitors the utilization amount integrating meter and notifies the authorization center when the software utilization exceeds a specified amount.

19. The software charging system according to claim 18, wherein when an end user requests changing from an amount-base charging to a selling system, said utilization permitting part reports the value of said utilization amount integrating meter to the authorization center, and, based on the received integrated amounts said authorization center subtracts some from fees paid based on the amount-base charging or all from a price when the software is purchased.

20. The software charging system according to claim 18, wherein said utilization amount integrating meter includes a system changed value storing means for registering an integrated value of changing from the software amount-base charging system to the selling system, and when said integrated value exceeds an integrated value stored in the system changed value storing means, changing is made from the amount-base charging system to the selling system within the utilization permitting device.

21. A utilization permitting device for permitting access to protected software by a user, comprising:

a clock obtaining date and time data each time the protected software is accessed by the user;

date and time data storing means for storing obtained date and time data until a next access to the protected software by the user;

utilization permission processing part generating utilization permitting signals for utilization requests in accordance with a balance of a utilization amount, the utilization amount being a number of days of allowed use of the software program and being set by an authorization center; and a utilization amount managing part calculating the balance of the utilization amount, based on date and time data obtained by the clock for a current access to the protected software by the user and time and date data stored by the date and time storing means for a previous access to the protected software by the user.

22. A software charging system for permitting a user access to software, comprising:

an authorization center which sets a number of days of allowed use of the software as a utilization balance; and a utilization permitting device which permits access to the software by the user in accordance with the utilization balance set by the authorization center, and reduces the utilization balance in accordance with the number of days the user has used the software while permitted access.

23. A software charging system for permitting a user access to software, comprising:

an authorization center which sets a number of days of allowed use of the software as a utilization balance; and a utilization permitting device which reduces the utilization balance in accordance with the number of days the user has used the software while permitted access, and permits access to the software by the user while there is a remaining utilization balance.

24. A software charging system as in claim 23, wherein the utilization permitting device permits unlimited access to the software by the user while there is a remaining utilization balance.

* * * * *